(12) United States Patent
Gan et al.

(10) Patent No.: US 9,338,133 B1
(45) Date of Patent: May 10, 2016

(54) LOCATING OPTIMUM SECURITY GATEWAY

(71) Applicant: Sprint Communications Company L.P., Overland Park, KS (US)

(72) Inventors: Seng Gan, Ashburn, VA (US); Michael Francis Fiumano, McLean, VA (US); Aaron Paul Hinkle, Centreville, VA (US); Reiko Miller, Manassas, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 3 days.

(21) Appl. No.: 14/532,290

(22) Filed: Nov. 10, 2014

(51) Int. Cl.
*G06F 9/00* (2006.01)
*H04L 29/06* (2006.01)
*H04W 12/00* (2009.01)

(52) U.S. Cl.
CPC ............... *H04L 63/02* (2013.01); *H04W 12/00* (2013.01)

(58) Field of Classification Search
USPC .................................. 726/12, 3; 713/166, 153
See application file for complete search history.

(56) References Cited

U.S. PATENT DOCUMENTS

| | | | | |
|---|---|---|---|---|
| 8,200,967 B2 * | 6/2012 | Lucidarme | ............... | H04L 41/08 380/277 |
| 8,204,543 B2 * | 6/2012 | Keevill | ............... | H04L 12/5692 455/426.1 |
| 8,244,209 B2 * | 8/2012 | Harvey | ............... | H04B 7/18508 455/410 |
| 8,600,424 B2 * | 12/2013 | Chen | ................... | H04W 52/244 370/318 |
| 2010/0008259 A1 * | 1/2010 | Yoon | ..................... | H04W 36/08 370/254 |
| 2010/0031314 A1 * | 2/2010 | Rydnell | ............ | H04W 36/0072 726/3 |
| 2010/0189096 A1 * | 7/2010 | Flynn | .................... | H04L 67/327 370/352 |
| 2011/0019612 A1 | 1/2011 | Grayson et al. | | |
| 2011/0110520 A1 * | 5/2011 | Ness | ..................... | H04W 48/20 380/270 |
| 2011/0252477 A1 * | 10/2011 | Sridhar | ................... | H04L 12/14 726/24 |
| 2012/0094666 A1 * | 4/2012 | Awoniyi | ............... | H04W 48/16 455/435.1 |
| 2014/0075506 A1 * | 3/2014 | Davis | ..................... | H04L 67/12 726/3 |

OTHER PUBLICATIONS

BGP Best Path Selection Algorithm, Document ID: 13753, Cisco Systems, Inc., Updated Jun. 13, 2014, 8 pages. http://www.cisco.com/c/en/us/support/docs/ip/border-gateway-protocol-bgp/13753-25.html.

Gu et al., Capacity Analysis and Optimization in Heterogeneous Network with Adaptive Cell Range Control, Hindawi Publishing Corporation, International Journal of Antennas and Propagation, vol. 2014, Article ID 215803, Published Apr. 29, 2014, 11 pages. http://www.hindawi.com/journals/ijap/2014/215803/.

Migault, et al., IKEv2 Security Gateway Discovery, Dec. 3, 2013, 6 pages, http://www.ietf.org/proceedings/86/slides/slides-86-ipsecme-8.pdf.

Cox, John, LTE Performance Will Hinge on Picocell Backhaul, Network World, Mar. 22, 2011, 3 pages. http://www.networkworld.com/article/2201254/wireless/lte-performance-will-hinge-on-picocell-backhaul.html.

Trust Based Secure Gateway Discovery Mechanism for Integrated Internet and MANET, Distributed Computing and Internet Technology, Lecture Notes in Computer Science vol. 7753, 2013, 4 pages. http://link.springer.com/chapter/10.1007%2F978-3-642-36071-8_7.

* cited by examiner

*Primary Examiner* — Amare F Tabor

(57) ABSTRACT

A method, system, and medium are provided for locating an optimal security gateway. A default gateway receives a request to access a macrocell. The default security gateway obtains a current location for each macrocell in response to a security gateway discovery function. Based on the response, routes to a best security gateway for each macrocell are determined. A best security gateway is identified based on factors that include the distance from a picocell connected to the default security gateway having backhaul traffic to offload to the appropriate macrocells connected to the best security gateway.

15 Claims, 4 Drawing Sheets

LOCATING OPTIMUM SECURITY GATEWAY

SUMMARY

Embodiments of the invention are defined by the claims below. Embodiments of the invention provide a medium, system, and method for, among other things, locating optimum security gateways with access to macrocells that receive backhaul traffic from picocells. The embodiments of the invention have several practical applications in the technical arts including reducing congestion in a picocell, selecting a best security gateway for a macrocell, and switching between a default security gateway and a best security gateway.

In a first aspect, a set of computer-useable instructions are executed in a computing system to select the best security gateway. In one embodiment, a picocell may connect to a default security gateway, which locates appropriate macrocells based on a discovery function executed by the default security gateway. The default security gateway determines the best security gateway for the appropriate macrocells. In certain embodiments, the best security gateway is identified based on the distance from the picocell connected to the default security gateway. The picocell may have backhaul traffic to offload to the appropriate macrocells connected to the best security gateway. Upon identifying the best security gateway, the picocell disconnects from the default security gateway and connects to the best security gateway for the appropriate macrocell.

Accordingly, embodiments of the invention provide a telecommunication system for identifying a best security gateway. The telecommunication system comprises default security gateways, picocells, and macrocells. The one or more default security gateways may execute discovery functions that identify the best security gateway, which has access to the one or more macrocells. At least one picocell connects to the one or more default security gateways to determine the current best security gateway. The one or more macrocells are configured to connect to the current best security gateway, wherein the macrocells report their available capacity for receiving backhaul traffic that is offloaded from the at least one picocell that connects to the best security gateway.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
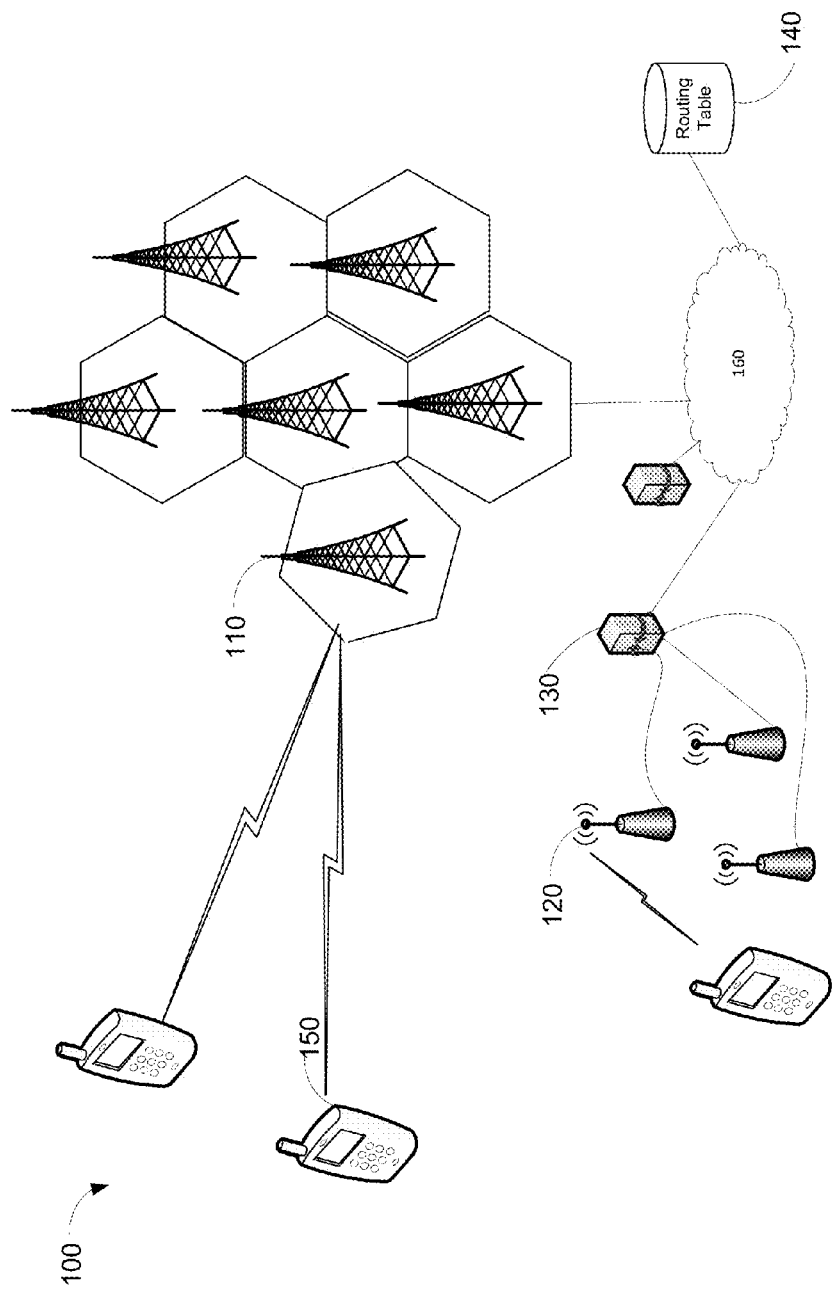
FIG. 1 is a network diagram that illustrates an exemplary operating environment, according to embodiments of the invention.

Embodiments of the present invention provide media, systems, and methods for locating an optimum security gateway. The optimum security gateway connects to a macrocell with sufficient capacity to handle backhaul traffic provided by a picocell. In some embodiments, the picocell is a long-term evolution device that transmits data over the Internet to a selected macrocell. To protect this traffic, the data between the LTE picocell and the core network may be encrypted via Internet protocol security (IPSEC) tunnel. The IPSEC tunnel originates from the LTE picocell through the Internet and terminates on the security gateway or macrocell. The core network may have a limited number of security gateway locations with access to macrocells that are currently available to connect with the picocell. To provide a low latency handover of traffic between the picocell and a neighboring macrocell, the picocell connects to the best security gateway, which may be the current security gateway with the lowest latency connection to a neighboring macrocell.

In some embodiments, the picocell may discover the best security gateway and connect to the best security gateway to access the macrocell. The picocell may initially connect to the wireless network using a default security gateway. In at least one embodiment, the picocell reports its current location (i.e., global positioning system (GPS) location and/or street address) to a security gateway discovery function (SGDF) of the default security gateway. The SGDF uses the picocell's location to locate the closest macrocell to the picocell connected to the default security gateway. The closest macrocell is selected from one or more macrocells that are available to perform handover (i.e., X2). The SGDF may use identifiers for the one or more macrocells to locate in a routing database the current best security gateway for the picocell. The SGDF receives recommendations of the best security gateway for the picocell. The recommendations may include the current domain name or internet protocol address of the best security gateway. In turn, the picocell disconnects from the default security gateway and connects to the network via the best security gateway using the information included in the recommendation provided by the SGDF. In some embodiments, the IPSEC tunnel may be added and deleted throughout the wireless network. Additionally, the picocell periodically discovers the best security gateway as network conditions change.

As utilized herein, the term "component" refers to any combination of hardware, software, and firmware. Computer-readable media includes both volatile and nonvolatile media, removable and non-removable media, and contemplates media readable by a database, a switch, and various other network devices. Network switches, routers, and related components are conventional in nature, as are means of communicating with the same. By way of example, and not limitation, computer-readable media comprises computer storage media and communications media.

Throughout this patent several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

CDMA Code Division Multiple Access
CD-ROM Compact Disc, Read Only Memory
CDMA Code Division Multiple Access
DVD Digital Versatile Disc
EVDO Evolution Data Optimized
EEPROM Electrically Erasable Programmable Memory
GPRS General Packet Radio Service
GPS Global Positioning System GSM Global System for Mobile communications (Groupe Spécial Mobile)
IP Internet Protocol
IPSEC Internet Protocol Security
IPv4 Internet Protocol Version Four
IPv6 Internet Protocol Version Six
LTE Long Term Evolution
NFC Near-Field-Communication
RAM Random Access Memory
ROM Read Only Memory
SGDF Security Gateway Discovery Function
TDMA Time Division Multiple Access
UMTS Universal Mobile Telecommunications System
USB Universal Serial Bus
Wi-Fi Wireless Fidelity
WiMAX Worldwide Interoperability for Microwave Access Embodiments of the invention identify the current optimal security gateway for one or more picocells in a telecommunication system with several wireless devices. The telecommunication system includes one or more default security gateways, picocells, and macrocells. The one or more default security gateways execute discovery functions that identify the best security gateway. At least one picocell connects to the one or more default security gateways to determine the current best security gateway. The one or more macrocells are configured to connect to the current best security gateway. The macrocells, in some embodiments, report their available capacity for receiving backhaul traffic that is offloaded from the at least one picocell that connects to the best security gateway.

FIG. 1 is a network diagram that illustrates an exemplary operating environment 100, according to embodiments of the invention. The exemplary operating environment 100 includes macrocells 110, picocells 120, security gateways 130, routing tables 140, wireless devices 150, and a wireless network 160.

The macrocells 110 are large towers that are part of the core wireless network. The macrocells connect to one or more security gateways through the wireless network 160. The macrocells 110 are in a secure environment. They serve an authenticated group of wireless devices 150. The macrocells 110 facilitate wireless communication between the wireless devices 150. The macrocells 110 are associated with one or more overlapping or non-overlapping coverage areas. As the wireless devices 150 move among coverage areas, the macrocells 110 may be utilized to receive communication data from the wireless devices 150 and further process the communication data.

In some embodiments, the macrocells 110 also receive traffic offloaded from picocells 120 that have been authenticated by a security gateway 130. Each macrocell 110 periodically reports the available capacity at the macrocell 110, location information for the macrocell 110, the current security gateway 130 that the macrocell is connected to, and the current signal strength at the macrocell 110. The reports are received by the routing table to update routes between the macrocells 110 and the security gateways 130. In some embodiments, picocells 120 may offload traffic to the macrocells with unused capacity and wireless conditions that are acceptable for the communications (e.g., video, voice, data, etc.) that are included in the offloaded traffic.

The picocells 120 are smaller towers that receive communication traffic from customer devices. The picocells 120 may include edge devices of the wireless network 160. In some embodiments, the picocells 120 are configured to direct traffic to the core of the wireless network 160. The picocells 120 receive communication traffic from the wireless devices 150. The wireless devices 150 connect to the picocells 120 to complete communications, including data transfers, phone calls, web browsing, etc. In some embodiments, the picocells 120 connect to macrocells 110 to offload communication traffic. In some embodiments, the picocells 120 are configured to periodically offload communication traffic to the macrocells 110. For instance, the picocells 120 may connect to the macrocells 110 when the traffic at the picocells 120 exceeds a specific threshold. To connect to the macrocells 110, the picocells 120 connect to one or more default security gateways 130. The picocells 120 authenticate at the one or more default security gateways 130 and request a recommendation for the best security gateway 130 for connecting to the macrocells 110 within a predefined distance of radius of the picocells 120. The default security gateways 130 provide access to the macrocells 110 based on the recommended best security gateway 130.

In one embodiment, the security gateways 130 prevent unauthorized access to the core of the wireless network. Without properly authenticating at the security gateways 130, access to, among other things, the macrocells 120 and routing tables 140 is denied. The picocells 120 connect to one or more default security gateway 130 from a collection of security gateways 130. The default security gateways 130, upon authenticating the picocells 120, execute an SGDF to identify the optimal security gateway 130 for the authenticated picocells 120. The SGDF provides a recommendation of the optimal security gateway 130 for the picocell 120 based on, among other things, the current location. The optimal security gateway 130 may be connected to one or more macrocells 110. The recommendation from the default security gateway 130 may identify one or more macrocells 110 with capacity to receive traffic that would be offloaded from the picocell 120 to a macrocell after the picocell connects and authenticates at the optimal security gateway 130.

The routing tables 140 store information about each security gateway 130 and the macrocells 110 that are connected to the security gateways. The routing tables 140 store an identifier for each macrocell 110, location information for each macrocell 110, the available capacity at each macrocell 110, and the current signal strength at the macrocell 110. The routing table 140 also includes an indication for each of the security gateways 130 that the current macrocell is connected to. Accordingly, based on the information in the routing tables 140, the default security gateways 130 generate recommendations of the optimal security gateway 130 for the picocell 120.

The wireless devices 150 may connect to the wireless network 160. The wireless devices 150 may connect directly to the core (e.g., macrocells 110) of the wireless network 160, in some embodiments. In other embodiments, the wireless devices 150 connect to an edge (e.g., picocells 120) of the wireless network 160. The wireless devices 150 transfer traffic (e.g., voice communication, video communications, and data communications) to the macrocells 110 or the picocells 120.

The wireless network 160 may support illustrative wireless telecommunications technologies. These technologies include CDMA, GPRS, TDMA, GSM, WiMAX, LTE, UMTS, and the like. In some embodiments, wireless devices 150 may also support other types of wireless communications including Wi-Fi communications, Bluetooth™, Zigbee, or other near-field communication.

One of ordinary skill in the art appreciates and understands that the exemplary operating environment 100 has been simplified and that alternate arrangements fall within the scope and spirit of the above description.

In some embodiments, the macrocells are connected to wireless devices or picocells. The macrocells may have capacity to take on additional traffic but may be located in a region that is outside of a specified radius. The macrocells may become congested because of changes in signal strength or usage patterns at the picocell or wireless device currently connected to the macrocells. A routing table, in some embodiments, receives usage and signal strength reports from each of the macrocells in the wireless network. Based on this information in the routing table, the SGDF makes the recommendations of the optimal security gateway for picocells that are currently connected a macrocell or picocells that are requesting access to a picocell.

Figure 2:
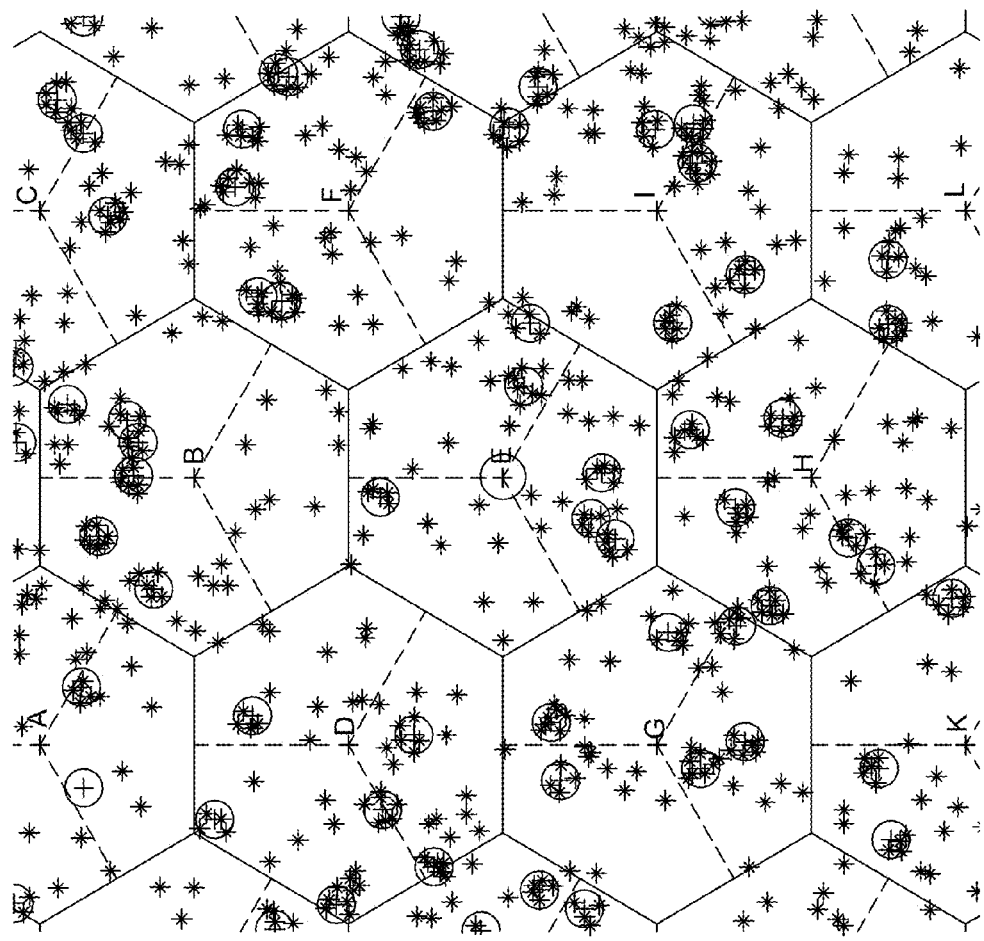
FIG. 2 is a wireless network cell diagram illustrating usage of several macrocells, according to embodiments of the invention.

FIG. 2 is a wireless network cell diagram illustrating usage of several macrocells, according to embodiments of the invention. The cell sector 200 includes approximately 12 macrocells (A-L) with overlapping coverage for picocells and wireless devices in the wireless network. Each macrocell may have a number of picocells or wireless devices that are currently connected to it. Accordingly, the current bandwidth usage at each of the macrocells may vary.

In one embodiment, a routing table 210 includes a macrocell identifier, location, and usage for each macrocell in the wireless network. In other embodiments, the routing table 210 may also include the security gateways that are connected to each macrocell. The routing table 210 is accessible by each security gateway to make recommendations of the current best security gateway for picocells that have backhaul traffic to offload to the wireless network core.

Figure 3:
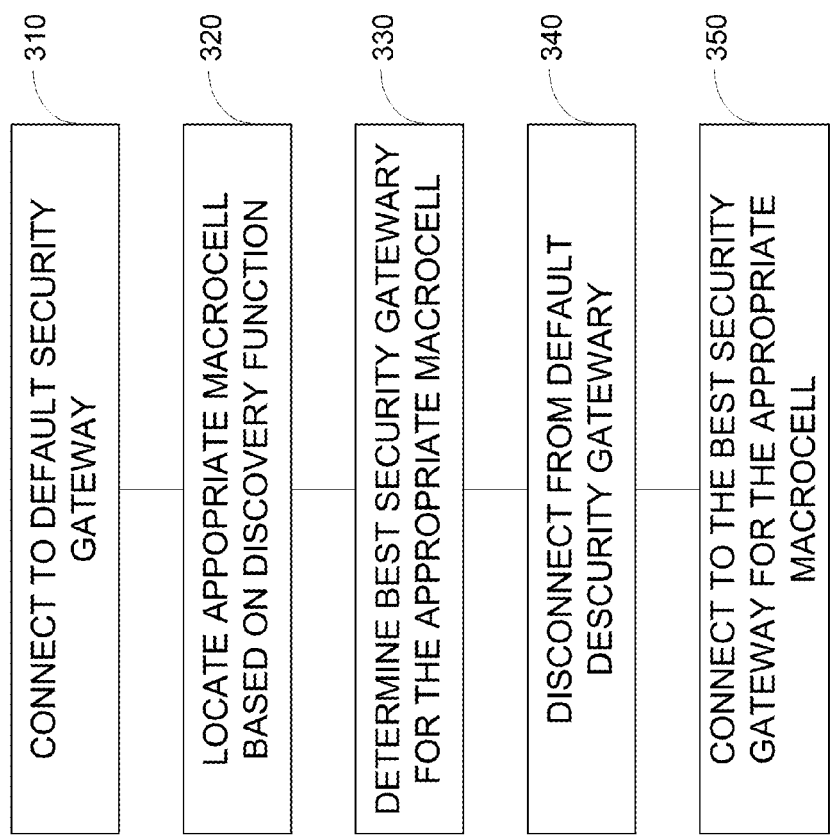
FIG. 3 is a logic diagram that illustrates a method of selecting a best security gateway that provides access to a macrocell.
Figure 4:
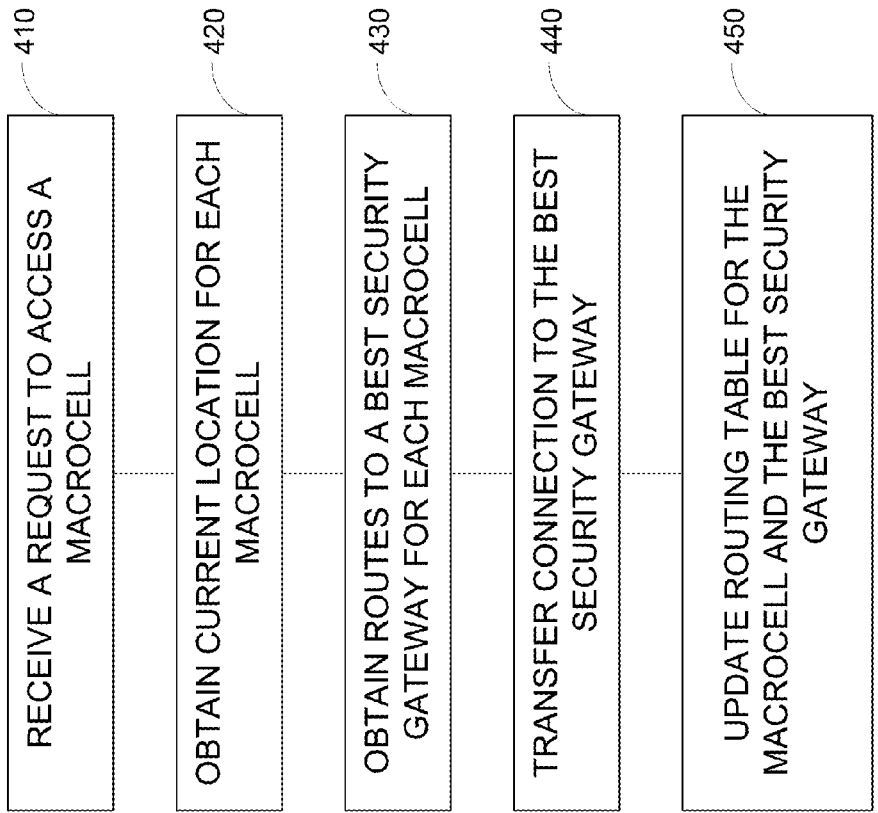
FIG. 4 is a logic diagram that illustrates a method of switching from a default security gateway to an optimum security gateway, according to embodiments of the invention.

The security gateways are selected as optimal based on picocell location and current macrocell capacity in some embodiments of the invention. Initially, a picocell connects to a default security gateway to determine the current optimal security gateway. In turn, the picocell switches to the best security gateway for the picocell. FIGS. 3 and 4 illustrate exemplary methods that may be utilized to select the best security gateway and switch to the best security gateway.

FIG. 3 is a logic diagram that illustrates a method of selecting a best security gateway that provides access to a macrocell. The method may initialize when a picocell requests access to a macrocell. In step 310, the picocell connects to a default security gateway. The default security gateway locates appropriate macrocells based on a discovery function executed by the default security gateway, in step 320. In turn, the best security gateway for the appropriate macrocells is determined by the default security gateway, in step 330.

The best security gateway is identified based on the distance from the picocell connected to the default security gateway. The picocell, in some embodiments, has backhaul traffic to offload to the appropriate macrocells connected to the best security gateway. The appropriate macrocells are located by identifying current unused capacity at each macrocell within a distance radius of the picocell. In some embodiments, a routing table is updated based on the best security gateway selected for the picocell.

The picocell disconnects from the default security gateway, in step 340. In some embodiments, the default security gateway may be selected as the best security gateway if other macrocells for neighboring security gateways are currently unable to offload the backhaul traffic. The backhaul traffic may include any combination of: voice communication, video communication, and data communication. In step 350, the best security gateway is connected to the picocell, which allows the backhaul traffic to be offloaded to the appropriate macrocell.

The picocell transmits the backhaul traffic of one or more wireless devices to one or more appropriate macrocells via the best security gateway. At least one macrocell selected as the appropriate macrocell for the best security gateway and the available capacity for the selected appropriate macrocell is updated upon receiving the backhaul traffic. In some embodiments, the backhaul traffic is distributed among two or more macrocells associated with the best security gateway. In one embodiment, the picocell is temporarily connected to the best security gateway. Additionally, the best security gateway may be updated periodically to reflect dynamic wireless network conditions.

In other embodiments, the picocell switches from the default security gateway to the best security gateway. The switch occurs in response to the recommendations from the SGDF. In some embodiments, the picocell may periodically switch to a current best security gateway in response to changes in various conditions (capacity, signal strength, number of connected picocells, etc.) on the wireless network.

FIG. 4 is a logic diagram that illustrates a method of switching from a default security gateway to an optimum security gateway. A picocell may be connected to a default security gateway. In turn, at step 410, the default security gateway receives a request to access a macrocell. The default security gateway, in step 420, obtains a current location for each macrocell in the wireless network. The default security gateway may locate the appropriate macrocells by identifying current unused capacity at each macrocell within a distance radius of the picocell. In step 430, routes to a best security gateway for each macrocell are determined by the default security gateway. The best security gateway is identified based on the distance from the picocell connected to the default security gateway having backhaul traffic to offload to the appropriate macrocells connected to the best security gateway. In step 440, the default security gateway transfers the picocell connected to the default security gateway to the best security gateway.

The picocell disconnects from the default security gateway. In step 450, the default security gateway updates a routing table for the macrocell and the best security gateway. The picocell transmits the backhaul traffic of one or more wireless devices to the one or more appropriate macrocells via the best security gateway. The backhaul traffic may include any combination of: voice communication, video communication, and data communication. The backhaul traffic is received from a collection of wireless devices that connect to the picocell.

The backhaul traffic, in one embodiment, may be distributed among two or more macrocells associated with the best security gateway. The capacity information in a routing table having the one or more appropriate macrocells and the best security gateway is updated by the best security gateway. In one embodiment, the picocell may temporarily connect to the best security gateway such that the best security gateway is updated periodically and the picocell switches to the current best security gateway. The best security gateway is selected from a collection of security gateways that serve the appropriate macrocells.

In summary, embodiments of the invention are directed to a telecommunication system for identifying a best security gateway. The telecommunication system includes a default security gateway, a picocell, and macrocells. The default security gateway executes SGDF to identify the current best security gateway that has access to the one or more macrocells. The picocell connects to the default security gateways to determine the current best security gateway. In turn, the one or more macrocells are configured to connect to the best security gateway. Each macrocell reports its available capacity for receiving backhaul traffic that is offloaded from the picocell that connects to the current best security gateway that serves the macrocell.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible non-transitory computer-readable media having computer-useable instructions embodied thereon for a method of selecting an optimum security gateway, the method comprising:
   connecting to a default security gateway;
   locating appropriate macrocells based on a discovery function executed by the default security gateway;
   determining the best security gateway for the appropriate macrocells, wherein the best security gateway is identified based on the distance from a picocell connected to the default security gateway having backhaul traffic to offload to the appropriate macrocells connected to the best security gateway;
   disconnecting from the default security gateway;
   connecting to the best security gateway for the appropriate macrocells;
   updating a routing table based on the best security gateway selected for the picocell;
   selecting at least two or more macrocells as the appropriate macrocells for the best security gateway; and
   altering available capacity for the selected macrocells upon receiving the backhaul traffic, wherein the backhaul traffic is distributed among two or more macrocells associated with the best security gateway but the default security gateway is selected as the best security gateway if the available macrocells are unable to offload the backhaul traffic.

2. The media of claim 1, further comprising transmitting the backhaul traffic of one or more wireless devices to one or more appropriate macrocells via the best security gateway.

3. The media of claim 1, wherein locating the appropriate macrocells includes identifying current unused capacity at each macrocell within a distance radius of the picocell.

4. The media of claim 1, wherein the picocell is temporarily connected to the best security gateway.

5. The media of claim 4, wherein the best security gateway is updated periodically.

6. The media of claim 1, wherein the backhaul traffic includes voice communication, video communication, and data communication.

7. A telecommunication system for identifying a best security gateway, the telecommunication system comprising:
   one or more default security gateways that execute discovery functions for identifying the current best security gateway that has access to one or more macrocells;
   at least one picocell that connects to one or more of the default security gateways to determine the current best security gateway;
   the one or more macrocells are configured to connect to the best security gateway, wherein the macrocells report their available capacity for receiving backhaul traffic that is offloaded from the at least one picocell that connects to the current best security gateway; and
   a routing table that is updated based on the best security gateway selected for the picocell such that at least two or more macrocells are selected as the appropriate macrocells for the best security gateway, wherein available capacity for the selected macrocells are altered upon receiving the backhaul traffic, which is distributed among the two or more macrocells associated with the best security gateway unless the default security gateway is selected as the best security gateway because the available macrocells are unable to offload the backhaul traffic.

8. The system of claim 7, wherein the routing table stores the available capacity information for each macrocell.

9. A method of switching from a default security gateway to an optimum security gateway, the method comprising:
   receiving, at the default security gateway, a request to access a macrocell;
   obtaining, at the default security gateway, a current location for each macrocell;
   obtaining routes to a best security gateway for each macrocell, wherein the best security gateway is identified based on the distance from a picocell connected to the default security gateway having backhaul traffic to offload to the appropriate macrocells connected to the best security gateway;
   transferring the picocell connected to the default security gateway to the best security gateway;
   disconnecting from the default security gateway;
   transmitting the backhaul traffic of one or more wireless devices to the two or more appropriate macrocells via the best security gateway, wherein the backhaul traffic is distributed among the two or more macrocells associated with the best security gateway; and
   updating capacity information in a routing table having the two or more appropriate macrocells and the best security gateway.

10. The method of claim 9, wherein locating the appropriate macrocells includes identifying current unused capacity at each macrocell within a distance radius of the picocell.

11. The method of claim 9, wherein the picocell is temporarily connected to the best security gateway.

12. The method of claim 11, wherein the best security gateway is updated periodically.

13. The method of claim 9, wherein the backhaul traffic includes voice communication, video communication, and data communication.

14. The method of claim 9, wherein the backhaul traffic is received from a collection of wireless devices that connect to the picocell.

15. The method of claim 9, wherein the best security gateway is selected from a collection of security gateways that serve the appropriate macrocells.

* * * * *